Dec. 6, 1960     E. G. FIELD     2,963,143
APPARATUS FOR HANDLING ARTICLES
Filed March 7, 1958     3 Sheets-Sheet 1
FIG_1
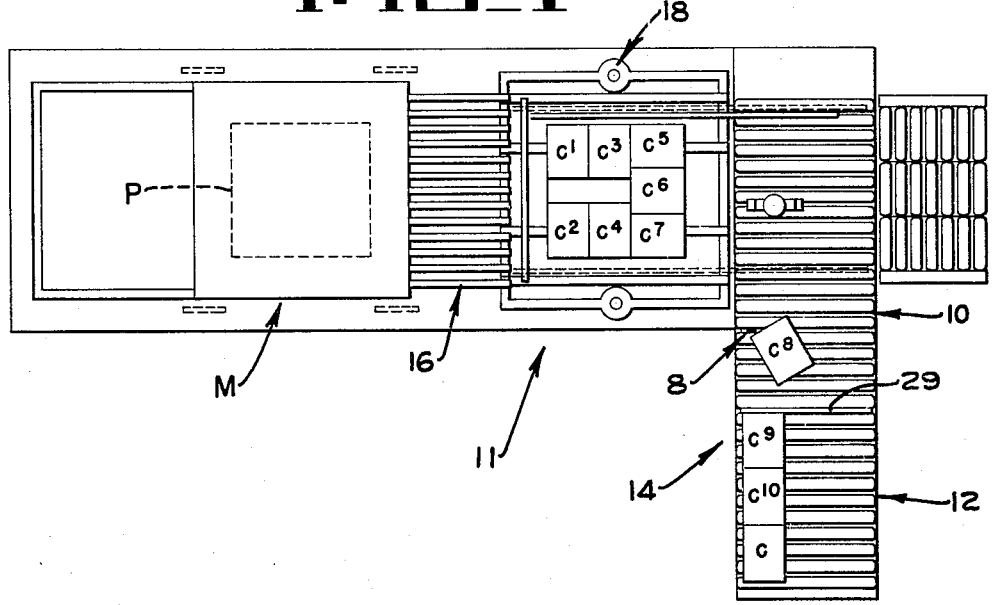
FIG_2
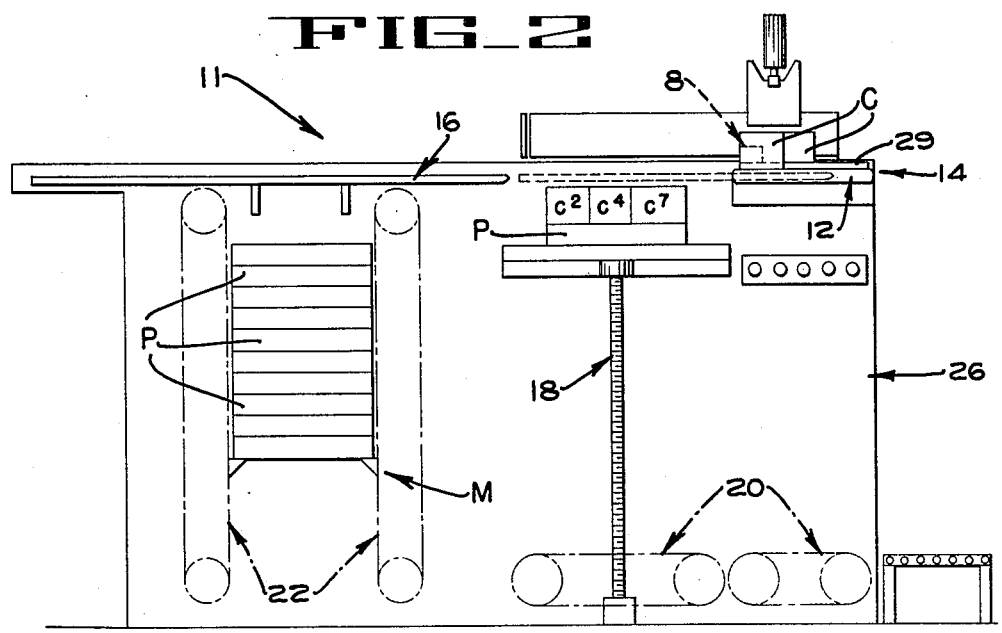
INVENTOR
EDWIN G. FIELD
BY Hans G. Hoffmeister
ATTORNEY Dec. 6, 1960  E. G. FIELD  2,963,143
APPARATUS FOR HANDLING ARTICLES
Filed March 7, 1958  3 Sheets-Sheet 2
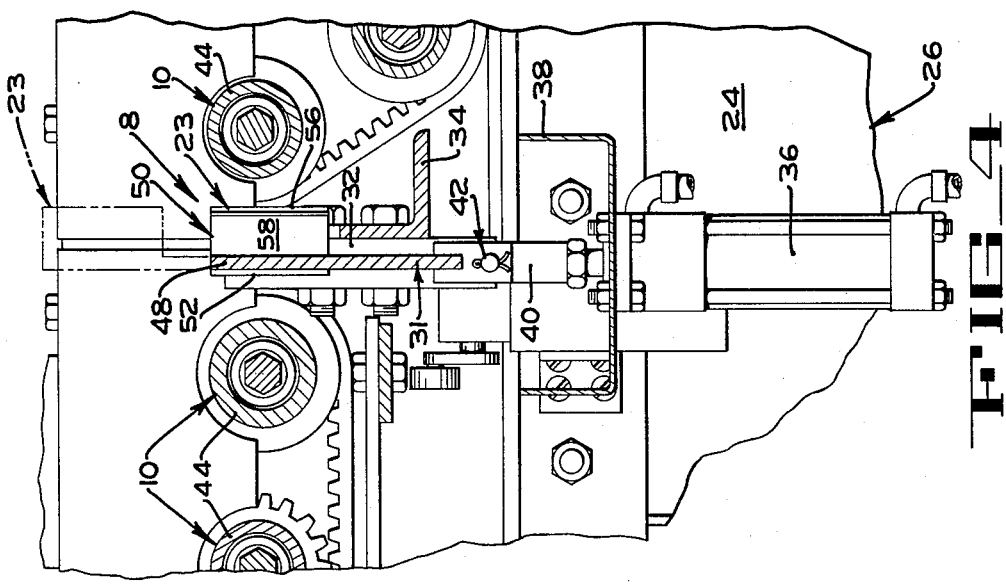
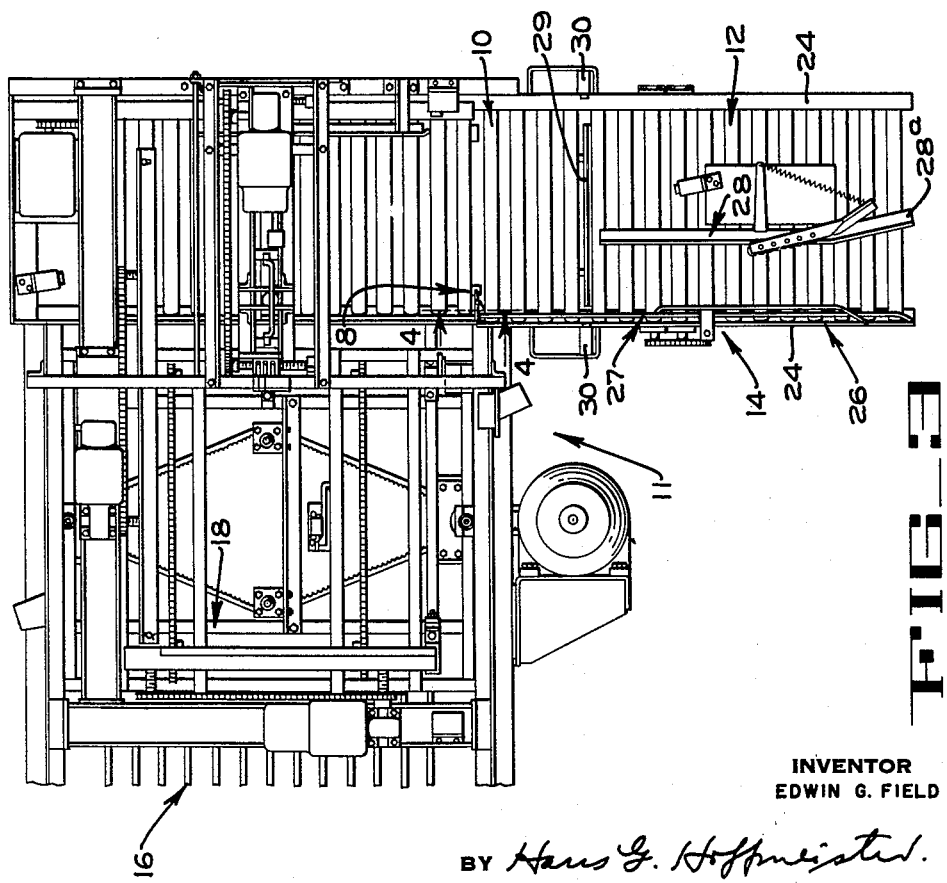
INVENTOR
EDWIN G. FIELD
BY Hans G. Hoffmeister
ATTORNEY

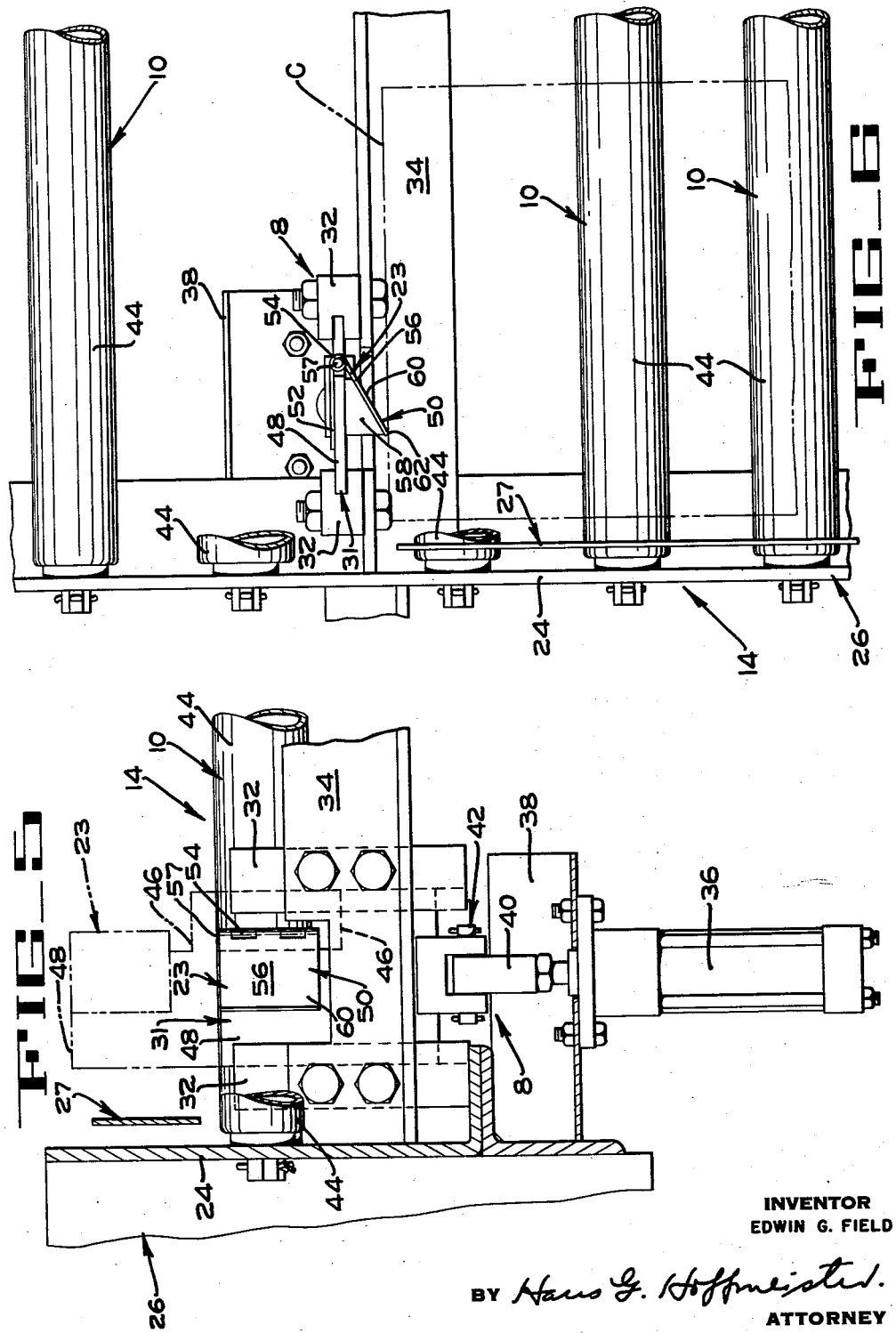

United States Patent Office 2,963,143
Patented Dec. 6, 1960

2,963,143

APPARATUS FOR HANDLING ARTICLES

Edwin G. Field, Oxnard, Calif., assignor to Food Machinery and Chemical Corporation, San Jose, Calif., a corporation of Delaware Filed Mar. 7, 1958, Ser. No. 719,809

8 Claims. (Cl. 198—33)

The present invention appertains generally to apparatus for handling articles such as boxes and cases and more particularly to means for pivoting the cases in a machine of the character described so as to change the aspect of the cases without substantially altering their course.

An object of the present invention is to provide an improved article turning apparatus.

Another object is to provide article or case pivoting means in a machine of the type mentioned which minimizes liability of damage to the cases or their contents resulting from the pivoting action.

Another object is to provide an improved article pivoting means capable of absorbing the full impact of a loaded, moving case with a minimum of damage to the case or its contents.

Another object is to provide in a machine for advancing articles an article turning device that applies to an article being turned a supplemental impulse in a direction opposite to the direction of advance of the article and offset from the center line of the article so as to assist in the turning of the article.

These and other objects and advantages of the present invention as well as the manner in which it is employed will become apparent from the following description and the accompanying drawings in which:

Fig. 1 is a diagrammatic plan of a case handling machine of the pallet loading type in which the case turner of the present invention is employed.

Fig. 2 is a diagrammatic side elevation of the pallet loading machine shown in Fig. 1.

Fig. 3 is a plan of a portion of the machine of Fig. 1 showing greater structural detail.

Fig. 4 is an enlarged fragmentary section of a portion of the pallet loading machine taken on lines 4—4 of Fig. 3 and showing in particular the turning device of the invention.

Figs. 5 and 6 are an enlarged front elevation and a plan, respectively, of the present case turner including structure of its environment, some of which is broken away.

As illustrated in Figs. 1, 2 and 3 of the drawings, the case turning device 8 of the invention is operatively associated with a high speed secondary conveyor 10 of a pallet loading machine 11. Cases C which it is desired to assemble into pallet loads by use of machine 11 are fed into the machine on a slower, primary conveyor 12 where a supply of cases may accumulate. Both the primary conveyor 12 and the secondary conveyor 10 are part of a feed conveyor system 14 of the pallet loading machine 11. From the primary conveyor 12, the cases C are delivered by the secondary conveyor 10 onto a horizontally reciprocable stripper carriage 16 where individual cases are assembled in a predetermined pattern or arrangement in forming each layer of a pallet load of cases comprising a plurality of layers. After accumulation of the first layer of cases C on the carriage 16, that layer is deposited onto a warehouse pallet P which is supported by an elevator 18 (Fig. 2) in the machine. After one layer of cases is deposited onto the elevator supported pallet various controls (not shown) are automatically actuated to lower the elevator 18 a distance substantially equal to the height of one layer of cases. Thereafter, another layer of cases is arranged upon the previously assembled layer each time the elevator is lowered. In this way, a pallet load containing the desired number of layers of cases is accumulated on the pallet. Upon completion of each pallet load the elevator 18 lowers the load until the pallet P thereof rests upon a takeaway conveyor 20 (Fig. 2) for removal of the loaded pallet from the machine 11. Pallets, which are of a well-known type, are automatically supplied as needed to the elevator from a supply of pallets on a conveyor 22 in a magazine M of the machine.

In order to provide a highly rigid or stable pallet load of cases C, some of the cases of the respective layers forming each load are turned so that the cases of each layer are arranged in a certain pattern wherein each case overlaps one or more cases of an adjacent layer to thereby form what is known in the trade as an interlocking load. Frequently, the pattern of alternate layers of cases will be the same with the exception that the patterns of the cases in successive layers are reversed. One manner in which the cases composing the layers may be arranged is shown in Fig. 1. The cases $C^1$, $C^2$, $C^3$, and $C^4$, of the first layer on the elevator are unturned from the aspect they bear with respect to the primary conveyor 12 as they are fed thereby to the secondary conveyor 10. As indicated, cases $C^5$, $C^6$, and $C^7$, of the first layer have been pivoted or turned 90° from their original aspect by the action of the turning device 8 (see case $C^8$). A bumper 23 (Figs. 4–6) of the case turner 8 is projected by appropriate mechanism into the path of specific ones of the oncoming cases C as they are advanced by the secondary conveyor 10 and the selected cases, upon engagement with the bumper 23, are pivoted in a counterclockwise direction (Fig. 1).

It is to be understood that by means of suitable controls (not shown) projection of the bumper 23 can be timed so as to achieve layer patterns different from that shown in Fig. 1. Continuing, however, with the description of the manner of assembling a load in which the first layer is as illustrated in Fig. 1, the pattern of the cases in the second layer will be the reverse of the arrangement in the first layer. The case $C^8$ which will be the first case of the second layer (Fig. 1) will be turned 90° with respect to the case $C^1$ so that in the completed pallet load it will rest upon cases $C^1$ and $C^3$. Cases $C^9$ and $C^{10}$, which will ultimately become part of the second layer of cases, will be turned so as to have the same aspect as that of the case $C^8$ in the final loaded position of the latter. In the completed pallet load, therefore, the case $C^9$ will rest upon cases $C^1$, $C^2$, $C^3$, and $C^4$, and the case $C^{10}$ will rest upon cases $C^2$ and $C^4$. After the cases $C^9$ and $C^{10}$ have passed the turning device 8, the bumper 23 is retracted so that the final four cases of the second layer and the initial four cases of the succeeding layer pass the zone of operation of the turner 8 without being turned. Thereupon, the bumper 23 is again projected into the path of the cases on the secondary conveyor 10. The third layer will then be assembled similarly to the first layer, and this method of assembly will be followed until a complete, effectively interlocked pallet load is assembled.

The slowly moving primary conveyor 12 and the faster moving, secondary conveyor 10 are of the live roll type and are operatively mounted between opposite side panels 24 (Fig. 3) by which the feed conveyor system 14 is supported in the frame structure 26 of the pallet loading machine. It will be understood that the conveyors 10 and 12 are suitably driven and controlled by appropriate means to coordinate their operation with other instrumentalities of the machine 11.

The cases C are delivered to the primary conveyor 12 in a more or less haphazard manner, i.e., the aspect of the various cases is not necessarily uniform nor are the cases necessarily aligned. Upon movement of the cases onto the conveyor 12 they enter between oppositely located guides 27 and 28 (Fig. 3). The guide 27 extends along the left-hand edge of the conveyor and is secured to the panel 24. The guide 28 is spaced from the guide 27 toward the longitudinal center line of the conveyor 12 (Fig. 3) and is adjustably supported above the conveyor 12. The end 28a of the guide 28 first encountered by the cartons projects obliquely with respect to the direction of carton advance and functions to bring the cases into alignment so that the same will be in single file and will have one narrow end leading. To state it another way the cases as they move along the primary conveyor 12 and onto the secondary conveyor 10 will move along a particular path or course and will have a certain aspect with respect to the path. Additionally, the guides 27 and 28 are related in location to the bumper 23 so that an area on the leading side of the cases between the center and the left hand side thereof engages the turning bumper 23 during further advancement of the cases by the secondary conveyor 10. The side of each case engaging the turning bumper 23 will hereinafter be called the front of the case.

As best understood from Fig. 3 the cases are advanced some distance by the secondary conveyor 10 before reaching the turning device 8. Since the cases are advanced more rapidly by the secondary conveyor 10 than by the primary conveyor 12 a gap is formed between the two adjacent cases located, respectively, on the secondary conveyor 10 and the primary conveyor 12. A stop gate 29 (Figs. 1 and 3) is operatively mounted on the frame structure 26 and is projected above the conveyor 12 into the gap formed following the entry of one case onto the secondary conveyor 10. The actuator (not shown) for the stop gate 29 is controlled by a sensing device such as a photo-electric cell 30 (Fig. 3). In this way only a single case is permitted to enter the secondary conveyor at any one time. All other cases are retained on the primary conveyor 12 by the stop gate 29 until the case on the secondary conveyor has advanced beyond the zone of operation of the turning device 8. For a more detailed description of the pallet loading machine with which the case turning device 8 of the invention is associated reference may be had to application Serial No. 584,730 of Earl J. McGrath et al. for "Apparatus for Handling Cases."

The turning device 8 of the invention is located closely adjacent the guide 27 defining one margin of the article path at the left-hand side of the conveyor 14 (Figs. 3 and 6) so that substantially the entire width of the conveyor 10 can be utilized, if necessary, by the cases in turning. As best shown in Figs. 4, 5, and 6, the bumper 23 of the case turner 8 comprises a carrier plate 31 that is mounted for vertical sliding movement in two opposed guideways 32 that are fixed in any convenient manner to a beam 34 extending between the opposite side panels 24 of the conveyor system 14. A double acting hydraulic or pneumatic power cylinder 36 is operatively mounted below the conveyor 10 by means of a bracket 38 secured to the frame structure 26. The plunger 40 of the power cylinder 36 is connected by a yoke and pin arrangement 42 (Figs 4 and 5) to the support plate 31. At appropriate times during the pallet loading operation fluid under pressure is supplied to the cylinder 36 (by means not shown) to project the bumper 23 above the rollers 44 of the secondary conveyor 10 into the path of an oncoming case as shown in phantom Figs. 4 and 5. After an appropriate number of cases have engaged and been turned by the bumper 23 it is positively retracted (full line Figs. 4 and 5).

A notch 46 is formed in the top of the bumper support plate 31 providing a narrow upstanding tongue 48 thereon adjacent the guide 27 (Figs. 5 and 6). A hinge-like member 50 having a vertical length slightly less than the vertical length of the tongue 48 is attached by one leaf 52 to the downstream side of the tongue 48 so that the hinge joint 54 is disposed vertically in the notch 46 closely adjacent the inner, vertical edge of the tongue. The other leaf 56 of the hinge member 50 which is freely pivoted at the hinge joint by means of a pin 57 projects in front of the upstream side of the tongue, and is in the form of an arm which acts as an abutment member or plate against which the cases C to be turned will strike. The top edge of the hinge member 50 is substantially aligned with the top of the tongue and when the bumper 23 is retracted, will be clear of any cases on the conveyor 10 (Fig. 4). The pivotally mounted leaf 56 extends horizontally and obliquely with respect to the tongue 48. A spring 58, which may be in the form of a block of resilient material such as rubber, is interposed between the tongue 48 and the leaf 56 and preferably is secured to both, as by bonding. The leaf 56 is normally held in such angular position with respect to the front of the oncoming cases that an obtuse angle is formed between the face 60 of the pivotally movable leaf 56 that is engaged by articles on the conveyor 10 and the side guide 27 (Fig. 6). Consequently, an acute angle is formed between the front of a case C (shown in phantom Fig. 6) and the leaf 56 as well as between the leaf 56 and the tongue 48. It will be noted (Fig. 6) that the initial point of contact at 62 between the front of the case C and the turning bumper 23 is closely adjacent the left-hand side of the case.

The secondary conveyor 10, it will be recalled, operates to advance the cases C at a relatively rapid rate and since the rollers 44 of the conveyor 10 are driven, some degree of traction exists between the cases thereon and the rollers. It is to be borne in mind, however, that the cases C are not positively driven and that slippage can occur between the cases and the rollers 44. Upon movement of one case C, to be turned, onto the secondary conveyor 10 from the primary conveyor 12 the speed of the case is accelerated to a rate closely approaching that of the conveyor 10 before engagement of the case with the projected turning bumper 23. The consequences in damage to a rapidly moving and a heavily loaded case and its contents upon engagement of the case with an unyielding turning bumper become obvious. The present improved turning bumper 23 prevents damage to the cases and their contents by providing the pivotally and resiliently mounted abutment plate 56 against which the cases strike to gradually arrest advance of the cases and absorb the impact formerly sustained almost completely by the cases.

In addition to preventing damage formerly caused to the loaded cases the turning device 8 performs an additional important function. At the moment the spring 58 is completely compressed when the full impact of the advancing case has been absorbed and the forward movement of the case at the side of the article path at which the turning device 8 is located is momentarily stopped, the spring 58 expands simultaneously with continued forward movement of a major portion of the case engaging the driven rollers 44 to the right of the tongue 48 (Fig. 6). The pivotal movement of the leaf 56 of the bumper 23 as the spring 58 returns to its fully expanded condition causes the leaf 56 to exert an impulse or reaction force upon the case at the left side of the case and in a direction opposite to the generally forward movement of the right hand side of the case caused by the conveyor 10. The resultant action of the expanding spring 58 and the advancing conveyor 10 causes the case to turn counterclockwise (Figs. 1 and 6) so that the front of the case slides along the oblique abutment member 56 and pivots about the hinge joint 54. When full forward movement of the case by the conveyor 10 is resumed it will have been turned substantially a quarter of a revolution from the aspect of the case as received by the secondary conveyor 10.

The strength of the spring 58 may be adapted to the weight of cases handled by the pallet loading machine. For example light weight cases loaded with plastic sponges will require a considerably lighter spring 58 to absorb the impact of the case against the turning bumper 23 than will heavier cases loaded with canned food products.

From the foregoing description it becomes apparent that by means of the turning bumper of the invention not only are the cases prevented from damage upon impact with the bumper during turning, but they are actually aided in turning by the bumper.

In the foregoing description cases of a type in which a wide variety of goods are commonly packaged for shipment are referred to in describing the apparatus of the invention and its operation. It is to be understood, however, that the apparatus of the invention is capable of other uses for instance: in turning filled sacks as well as other articles.

While a particular embodiment of the present invention has been shown and described, it will be understood that the turning bumper is capable of modification and variation without departing from the principles of the invention and that the scope of the invention should be limited only by the scope and proper interpretation of the claims appended hereto.

The invention having thus been described, what is believed to be new and desired to protect by Letters Patent is:

1. In an article handling machine, a conveyor adapted to advance articles singly along a certain path, a carrier mounted adjacent the conveyor and occupying a position between the center of the path and one side thereof, an abutment plate having a face engageable by the front of an article advancing on said conveyor, said abutment plate being pivotally attached to said carrier for horizontal movement and projecting from the carrier obliquely toward said one side of said path, and resilient means interposed between said abutment plate and said carrier and retaining said abutment plate with said article engaging face thereof at an obtuse angle with respect to said one side of the path, said resilient means being arranged to press said abutment plate against the article to apply a reaction force to the article adjacent said one side of the path in a direction opposite to article advance subsequently to impact of an article with said abutment plate to change the aspect of the article on the conveyor.

2. In an article handling machine, a support frame, a conveyor on said support frame having an article receiving end and adapted to advance articles along a certain path, a stop gate mounted on said support frame adjacent said article receiving end of the conveyor and adapted to be projected in front of articles entering said conveyor, means on said support frame associated with said conveyor and arranged to project said stop gate when one article is on said conveyor, a carrier mounted on said support frame in the path of an advancing article adjacent one side of said path, an abutment plate having a face engageable by an article on said conveyor, said abutment plate being pivotally mounted at the side of said carrier remote from said one side of said path and arranged for horizontal movement, and resilient means on said carrier arranged to resiliently retain said abutment plate with said article engaging face at an obtuse angle with respect to said one side of the path, said resilient means being arranged to press the abutment plate against the article and thereby to apply a reaction force against the article adjacent said one side of the path in a direction opposite to article advance subsequently to impact of an article with said abutment plate to change the aspect of the article on the conveyor.

3. In an article handling machine, a support frame, a conveyor on said support frame having an article receiving end and adapted to advance articles singly in one direction, guide means on said support frame associated with said conveyor and adapted to define one margin of an article path along said conveyor, a stop gate mounted on said support frame adjacent said article receiving end of said conveyor and adapted to be projected in front of articles entering said conveyor, means on said support frame associated with said conveyor and arranged to project said stop gate when one article is on said conveyor, an article turning device mounted on said support frame and disposed in the path of an advancing article adjacent said guide means and including an abutment plate having a face engageable by an article on said conveyor, means pivotally mounting said abutment plate for horizontal movement about a vertical axis, said abutment plate projecting from said axis toward said guide means, and resilient means resiliently retaining said abutment plate at an acute angle with respect to the leading face of said article whereby the resilient means is adapted to exert an article turning reaction force against said article at a point adjacent said guide means and in a direction opposite to the direction of article advance when the article is in engagement with said abutment plate.

4. In an apparatus for handling articles, a support frame, a first conveyor mounted on said support frame, a second conveyor mounted on said support frame adjacent said first conveyor, said second conveyor being adapted to receive articles from said first conveyor and arranged to advance the articles at a faster rate than said first conveyor, a stop gate mounted on said support frame at a location between said first and said second conveyors and arranged to be projected into the path of articles on said first conveyor, means on said support frame associated with said second conveyor and arranged to project said stop gate into the path of the articles on said first conveyor when one article is on said second conveyor, an article turning mechanism mounted on said support frame and disposed within one side of the path of an article advancing on said second conveyor, said turning mechanism including an abutment plate engageable by an article on said second conveyor, means pivotally supporting said abutment plate, and resilient means associated with said abutment plate and arranged to resiliently retain said abutment plate at an angle with respect to the leading face of said advancing article whereby said resilient means is adapted to exert an article turning reaction force against the article when the advancing article is in engagement with the abutment plate.

5. In an apparatus for handling articles, a support structure, a first article conveyor mounted on said support structure, means associated with said first conveyor and adapted to arrange articles advanced thereby into single file order in a certain path so as to have a particular aspect with respect to said conveyor, a second conveyor mounted on said support structure adjacent said first conveyor to receive articles from said first conveyor and arranged to advance articles at a faster rate than said first conveyor, a stop gate mounted on said support structure and arranged to be projected between said conveyors into the path of articles advanced by said first conveyor, means on said support structure associated with said second conveyor and arranged to project said stop gate when one article is on said second conveyor, and an article turning device mounted on said support structure and disposed in the path of an article advancing on said second conveyor adjacent one side of said path, said turning device including an abutment plate engageable by the front of said article advancing on said second conveyor, means pivotally mounting said abutment plate for movement about a vertical axis remote from said one side of said path and projecting from said axis toward said one side of the path, and resilient means operatively associated with said abutment plate and arranged to resiliently retain said abutment plate at an acute angle with respect to the leading face of said article advancing on said second conveyor whereby the resilient means is adapted to exert a reaction force on the article adjacent said one side thereof and in a direction opposite to the direction of article advance when the article is in engagement with the abutment plate.

6. A device for turning moving articles, comprising a vertically disposed plate, means for mounting said plate in the path of the articles, an arm pivotally attached to said plate for horizontal movement, and spring means associated with said plate and said arm and arranged to resiliently retain said arm at an acute angle with respect to one side of said plate.

7. A turning device in an article handling machine, comprising a vertically disposed plate, an upstanding tongue on said plate at the top thereof, a hinge member having two leaves pivotally connected at a hinge joint, one of said leaves being connected at one side of said tongue so as to dispose the hinge joint substantially vertically adjacent said tongue, and spring means associated with the other hinge leaf and said tongue and arranged to resiliently retain said other leaf at an acute angle with respect to another side of said tongue.

8. A turning device in an article handling machine, comprising a vertically disposed plate, a spring biased arm pivotally mounted on said plate and resiliently disposed at an angle with respect to one side of said plate, and means associated with said plate and arranged to guide said plate for reciprocatory movement.

References Cited in the file of this patent

UNITED STATES PATENTS

| | | |
|---|---|---|
| 1,179,383 | Adderson | Apr. 18, 1916 |
| 1,435,263 | Soubier | Nov. 14, 1922 |
| 2,243,557 | Finster | May 27, 1941 |
| 2,703,182 | Broberg | Mar. 1, 1955 |
| 2,816,647 | Ruth | Dec. 17, 1957 |